Jan. 17, 1967     C. J. PRANGE     3,298,666
RECIPROCABLE CLUTCH MEANS FOR FEEDING SEWER TOOL DRIVE ROD
Filed Sept. 24, 1965
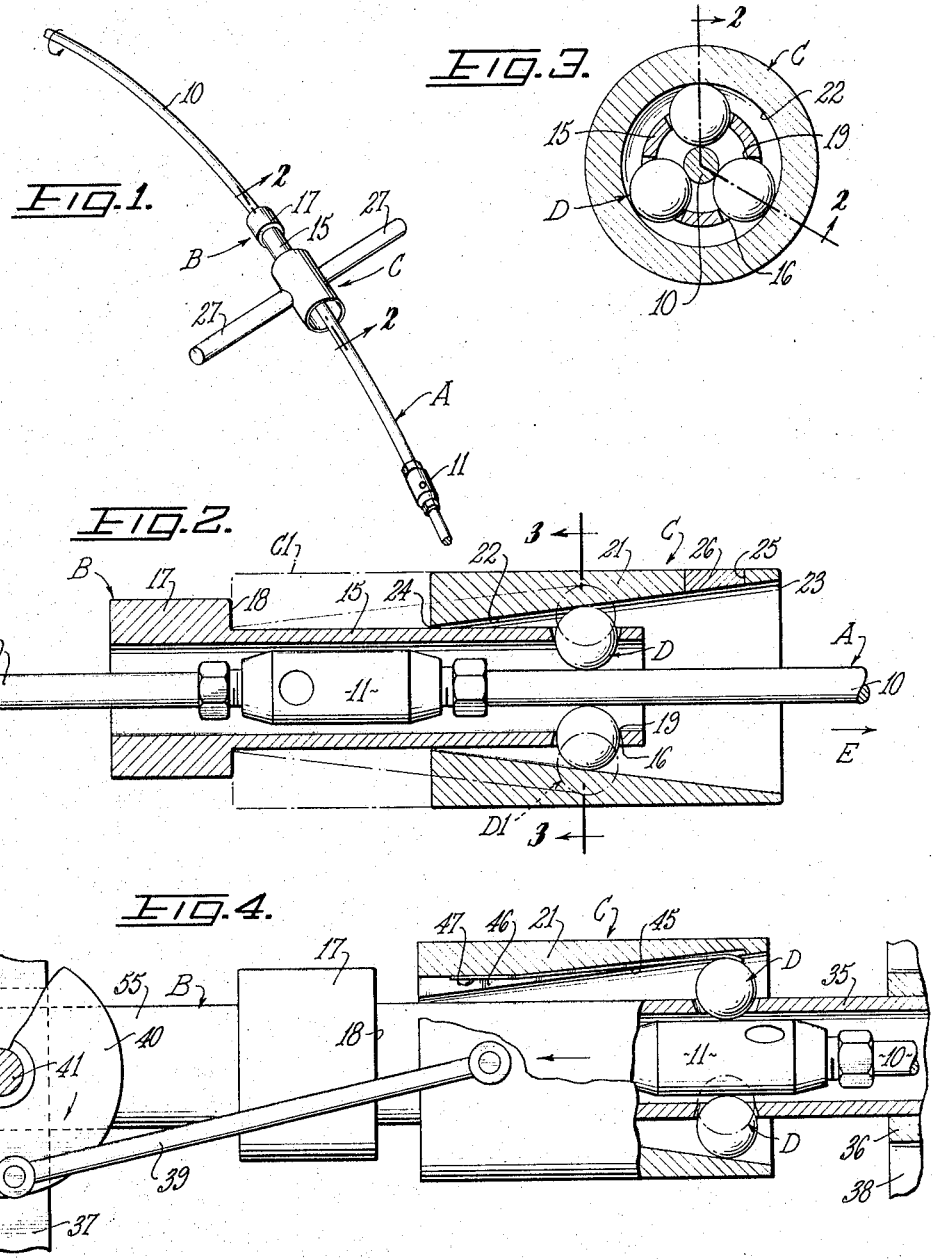
INVENTOR
CHARLES J. PRANGE
BY Lynn H. Latta
ATTORNEY united States Patent Office 3,298,666
Patented Jan. 17, 1967

3,298,666
RECIPROCABLE CLUTCH MEANS FOR FEEDING
SEWER TOOL DRIVE ROD
Charles J. Prange, Lima, Ohio, assignor to Flexible Sewertool Corporation, Lima, Ohio, a corporation of Ohio
Filed Sept. 24, 1965, Ser. No. 490,039
7 Claims. (Cl. 254—105)

This invention relates to apparatus for linearly feeding sewer tool drive rod into a sewer line to be cleaned, and has as its object to provide an improved one-way gripping clutch for transmitting alternate strokes of reciprocating movement to a drive rod so as to feed the same longitudinally. The invention can be embodied either in a manually-operable form wherein a handle or handles are provided for transmitting reciprocating movement manually through the clutch; or in a power-driven form wherein reciprocating movement is developed by power operation through a pitman or the like.

The invention is applicable particularly to the feeding of jointed drive rod embodying a series of rod sections connected end-to-end by couplings, and in this respect, the invention provides a one-way drive clutch which is capable of passing over the rod couplings and establishing gripping engagement with the rod sections. This is the principal object of the invention.

Further objects are to provide such a feed apparatus:
(1) Wherein an annular array of clutch balls are caged in sockets in one end of a tubular barrel having at its opposite end, abutment means for engagement by an actuator collar surrounding the barrel, for transmitting a retracting stroke from the collar to the barrel.
(2) Having means for retaining the balls from dropping into the barrel when not obstructed by a drive rod extending therethrough.
(3) Wherein the engagement of the actuator collar against the abutment means on the barrel determines a limit of retracting movement of the collar with reference to the barrel wherein the forward end of the collar is effective to retain the balls against outward escape from their sockets, while permitting them to spread apart sufficiently to allow a drive rod coupling to pass through the annular array of balls.

Other objects and advantages will become apparent in the ensuing specifications and appended drawing in which:
FIG. 1 is a perspective view of a manually operable rod-feeding tool embodying the invention;
FIG. 2 is an axial sectional view of the same, taken on the line 2—2 of FIG. 1;
FIG. 3 is a cross sectional view of the same taken on the lines 3—3 of FIG. 2 and of FIG. 3; and
FIG. 4 is a fragmentary axial sectional view of a power-driven embodiment of the invention.

Referring now to the drawings in detail, and in particular to FIGS. 1–3, I have shown therein as an example of one form in which the invention may be embodied, a tool for feeding a jointed drive rod A, said tool comprising a ball-cage barrel B; an actuating collar C encircling the barrel B; and an annular array of clutch balls D which are assembled between the barrel B and actuator collar C and adapted to transmit one-way feed movement from the collar C to the rod A in the direction indicated by the arrow F.

Drive rod A is of a well known type comprising a series of rod sections 10 connected end-to-end by couplings 11 of considerably larger diameter. The present invention deals with the problem of passing the array of clutch balls D over a coupling 11 during a return stroke from a position where the balls D have gripped the rod A forwardly of the coupling (as shown in FIG. 2) to a position in which the balls can obtain a fresh grip on the rod 10 rearwardly of the coupling just passed.

The barrel B comprises an elongated tubular body 15 having a forward end provided with an annular array of ball-cage apertures 16 and having a rearward end provided with an annular integral head 17 of enlarged diameter defining a stop shoulder 18 against which the actuator collar C will abut in a retracted position indicated in phantom at C1.

The ball-cage apertures 16 are frusto-conical, flaring to greater than ball diameter at their outer sides so as to permit the balls to freely shift radially outwardly to the retracted positions shown in phantom at D1; and being of minimum diameter at the inner wall of tubular body 15 so as to define respective retainer lips 19 of slightly smaller diameter than the balls D, whereby to prevent the balls from escaping inwardly into the tubular body 15 when the tool is removed from the drive rod. The balls as shown in full lines in FIG. 2 are positioned slightly outwardly of their inner limit positions, i.e. in slightly unseated relation to the retainer lips 19, so as to be free to be clamped tightly against the rod 10 in gripping engagement therewith.

The actuator collar C comprises a generally cylindrical body 21 having a frusto-conical internal wall 22 tapering from maximum diameter in a mouth 23 in its forward end to minimum diameter in a circular bearing lip 24 at its rear end. Lip 24 has sliding bearing engagement with the cylindrical outer wall of barrel body 15 such as to permit free reciprocating movement of the actuator collar C on the barrel. At the forward end of the collar C, the mouth 23 has a diameter such that the balls D, engaged thereagainst in the retracted position C1 of the collar, can assume the retracted positions D1 wherein their innermost extremities are disposed substantially at the diameter of the inner wall of barrel body 15 and outwardly of the outer diameter of a coupling 11 so as to permit the latter to freely pass between the balls as the tool is moved in a retracting stroke which carries the assembly of balls over the coupling 11. The angle of conical taper of the inner wall 22 of the collar is sufficiently low so that a substantial length of the collar (between ⅓ and ½) will project rearwardly from the balls, providing for two axially spaced areas of contact (1) between the inner wall 22 and balls; and (2) between the bearing lip 24 and the barrel body 15, such as to maintain substantial coaxiality between the collar C and the rod 10 during the feed operation. This angle may be approximately 10 degrees, in the range between 8 degrees and 15 degrees.

The length of the barrel body 15 is so related to the proportions of collar C that in the fully retracted position C1 of the collar, the balls D will be approximately centered in the plane of the forward end of the collar, but will be fully retained against escape from the assembly.

The tool is assembled by providing a radial bore 25 in the wall of collar C near its forward end at a position spaced from its rear end so as to register with the apertures 16 when the collar is in its fully retracted position C1; placing the collar in such retracted position; registering the aperture 25 with one of the apertures 16 and dropping a ball D through the aperture 25 and into the registering aperture 16; then rotating the collar C to bring aperture 25 in registration with another aperture 16 and repeating the process until all of the apertures 16 have received balls. A plug 26 is then secured in the aperture 25, either by threading it into a female thread provided in the bore 25 or by pressing the plug into interference fit with a cylindrical wall of the bore 25. The plug 26 prevents escape of the balls through the aperture 25, and thus the balls are effectively caged between the collar C and the barrel body 15, being unable to escape through the open mouth 23 of the collar C. Secured in diametrically opposite portions of the wall of collar C are a pair of handles 27 which may be grasped by a workman and utilized for transmitting reciprocating movement to the collar C.

In the form of the invention shown in FIG. 4, the tubular barrel body may be extended as shown at 35 and 55 and may be journalled in bearings 36 in suitable frame members 37 and 38, for axially sliding movement; and reciprocating movement may be transmitted to sleeve C by suitable means such as a pitman rod 39 linking the sleeve C to an eccentric 40 power-rotated through a drive shaft 41 from a suitable motor which can be connected to the shaft 41 through suitable transmission and clutch mechanism for starting and stopping the drive.

In the operation of the apparatus, when a forward stroke is transmitted to the sleeve C, the barrel B will tend to remain in fixed position by operation of inertia, and accordingly the collar C will be moved forwardly along the barrel body 15, driving the balls D radially inwardly in their socket apertures 16 by the wedging effect of its internal frusto-conical wall 22. As the balls establish engagement with the drive rod 10, any tendency of the balls and the barrel B to be dragged forwardly with the collar 26 will be temporarily arrested by the gripping of the drive rod 10, and the resistance of the latter to being pulled forwardly will cause the wedging action of collar C against the balls to be accentuated until a firm grip upon the drive rod 10 by the balls D is established. The drive rod 10 and the barrel B will then be pulled forwardly with the collar C to the end of the forward stroke thereof. As the return stroke of the collar C is commenced, the drive rod 10 will hold the balls D and barrel B in fixed position until the wedging engagement of the balls by the collar C is relaxed, and the inertia of barrel B will then tend to hold it in fixed position until the collar C has been retracted into abutting engagement with the shoulder 18 of head 17. The retracting stroke of collar C is then continued, pulling the barrel B rearwardly to a point where a fresh grip upon the drive rod 10 is to be established. Where the retracting stroke brings the balls D into contact with one of the couplings 11, the balls D will be spread apart by a wedging action of the coupling 11, and this return stroke will be normally continued until the balls D have completely passed the coupling 11, although it is to be understood that it is possible for the balls D to establish driving engagement with the periphery of a coupling 11 in response to a forward stroke of collar C to a short distance forwardly of its retracted position C1. As the balls reengage the driving rod, another forward feed movement will be imparted to the drive rod 10 during the balance of the forward stroke of actuator collar C, thus repeating another cycle of forward feed movement.

The operation of the apparatus of FIG. 4 is essentially the same as that described above with the exception that the amplitude of reciprocating stroke will be the same for every stroke, and where a retracting stroke ends with the balls D riding upon a coupling 11, the next forward stroke will normally cause the balls to grip the coupling and to impart a forward stroke to the drive rod through the coupling.

The action of inertia in opposing any tendency of the collar C to drag the barrel B rearwardly during its retracting stroke can be assisted by drag of the balls D against the drive rod. To this end, the balls may be spring-loaded radially inwardly into frictional engagement with the drive rod by means of leaf springs 45 received in internal axially-extending slots 46 in the collar 21, secured in the rearward end thereof at 46, and having free forward ends yieldingly bearing against the balls D and operative to press them inwardly into contact with the rod 10 when not obstructed by a coupling 11.

I claim:

1. Apparatus for feeding sewer tool drive rod consisting of rod sections joined end-to-end by couplings, comprising, in combination: a barrel comprising a tubular body having an internal diameter such as to permit free passage of a drive rod coupling therethrough, said body having a forward end with a plurality of socket apertures providing a ball-retainer cage, and said barrel having an annular head of enlarged diameter at its rear end; an annular array of clutch balls caged in said socket apertures while movable radially inwardly into engagement with a drive rod extending through said barrel; an actuator collar encircling said barrel and said array of balls, said collar having a frusto-conical inner wall engageable against said balls with a wedging effect such as to move said balls radially inwardly into gripping engagement with said drive rod in response to a forward stroke imparted to said collar and to then impart forward feed to said drive rod in a continuation of said forward stroke, said collar having a mouth defined near the forward-end thereof, of a diameter such as to permit said balls to spread apart radially sufficiently to permit a coupling to pass through said array of balls, while retaining said balls in caged condition; and means for imparting reciprocating strokes of said collar axially of said barrel, said collar being engageable with said head at a rear limit of retracting movement, and thereby operable to transmit retracting movement to said barrel so as to reposition it.

2. Apparatus as defined in claim 1, wherein said collar has, at its rear end, a bearing lip defined at the rear end of its said inner wall, said bearing lip having a diameter slightly larger than the outer diameter of said tubular barrel body, and in sliding bearing engagement therewith.

3. Apparatus for feeding sewer tool drive rod consisting of rod sections joined end-to-end by couplings, comprising, in combination: a barrel comprising a tubular body having an internal diameter such as to permit free passage of a drive rod coupling therethrough, said body having a forward end with a plurality of socket apertures providing a ball-retainer cage, and said barrel having at its rear end, radially outwardly projecting abutment means; an annular array of clutch balls caged in said socket apertures while movable radially inwardly into engagement with a drive rod extending through said barrel; an actuator collar encircling said barrel and said array of balls, said collar having a frusto-conical inner wall engageable against said balls with a wedging effect such as to move said balls radially inwardly into gripping engagement with said drive rod in response to a forward stroke imparted to said collar and to then impart forward feed to said drive rod in a continuation of said forward stroke, said collar having a mouth defined near the forward end thereof, of a diameter such as to permit said balls to spread apart radially sufficiently to permit a coupling to pass through said array of balls, while retaining said balls in caged condition; and means for imparting reciprocating strokes of said collar axially of said barrel, said collar being engageable with said head abutment means at a rear limit of retracting movement, and thereby operable to transmit retracting movement to said barrel so as to reposition it.

4. Apparatus as defined in claim 3, wherein said stroke-imparting means comprises handle means secured to said collar for manual actuation thereof.

5. Apparatus as defined in claim 4, wherein said handle means comprises a pair of diametrically opposed radially projecting handles.

6. Apparatus as defined in claim 3, wherein said stroke-imparting means comprises power-driven reciprocating mechanism.

7. Apparatus as defined in claim 3, wherein said socket apertures are frusto-conical, with maximum diameter at the outer surface of said barrel body and defining, at the inner wall thereof, retainer lips of slightly smaller diameter than the diameter of said balls, and operative to retain said balls against dropping into said barrel body when not obstructed by a drive rod extending through said barrel.

References Cited by the Examiner

UNITED STATES PATENTS

| | | |
|---|---|---|
| 700,412 | 5/1902 | Fischer. |
| 3,172,297 | 3/1965 | Thiene _____ 74—148 |

WILLIAM FELDMAN, *Primary Examiner.*

OTHELL M. SIMPSON, *Examiner.*